United States Patent
Gibson

(10) Patent No.: US 6,507,552 B2
(45) Date of Patent: Jan. 14, 2003

(54) AFM VERSION OF DIODE-AND CATHODOCONDUCTIVITY-AND CATHODOLUMINESCENCE-BASED DATA STORAGE MEDIA

(75) Inventor: Gary A. Gibson, Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 138 days.

(21) Appl. No.: 09/726,621

(22) Filed: Dec. 1, 2000

(65) Prior Publication Data

US 2002/0067634 A1 Jun. 6, 2002

(51) Int. Cl.[7] .................................. G11B 7/00
(52) U.S. Cl. ................ 369/126; 369/47.1; 250/306
(58) Field of Search ................ 369/126, 47.1, 369/53.1, 59.1, 44.14, 275.1; 250/326, 307

(56) References Cited

U.S. PATENT DOCUMENTS

| | | | |
|---|---|---|---|
| 4,427,886 A | 1/1984 | Martin et al. | 250/310 |
| 4,534,016 A | 8/1985 | Kirkpatrick et al. | 365/128 |
| 4,600,839 A | 7/1986 | Ichihashi et al. | 250/310 |
| 4,760,567 A | 7/1988 | Crewe | 369/101 |
| 5,216,631 A | 6/1993 | Sliwa, Jr. | 365/174 |
| 5,307,311 A | 4/1994 | Sliwa, Jr. | 365/174 |
| 5,402,410 A | 3/1995 | Yoshimura et al. | 369/275.1 |
| 5,537,372 A | 7/1996 | Albrecht et al. | 369/43 |
| 5,557,596 A | 9/1996 | Gibson et al. | 369/101 |
| 5,623,295 A | 4/1997 | Kishi et al. | 347/111 |
| 5,724,336 A | 3/1998 | Morton | 369/126 |
| 5,835,477 A | 11/1998 | Binnig et al. | 369/126 |
| 5,936,243 A | 8/1999 | Gibson et al. | 250/306 |
| 6,252,226 B1 * | 6/2001 | Kley | 250/306 |

OTHER PUBLICATIONS

J. A. Miller, et al., "Scanning tunneling microscopy bit making on highly oriented pyrolytic graphite: Initial results" J. Appl. Phys. vol. 68 (2), Jul. 15, 1990 pp. 905–907.

S. E. McBride, et al. "Nanometer–scale features produced by electric–field emission" Appl. Phys. Lett., 59 (23), Dec. 2, 1991 pp. 3056–3058.

S. Hosaka, etal., "SPM–based data storage for ultrahigh density recording" Nanotechnology 8, Feb. 6, 1997 pp. A58–A62.

S. Hoen, et al., "Thermomechanical data storage using a fiber optic stylus" Appl. Phys. Lett, vol. 64, No. 3, Jan. 17, 1994 pp. 267–269.

U. Staufer, et al., "Direct writing of nanometer scale structures on glassy metals by the scanning tunneling microscope" Z. Phys. B—Condensed Matter 77, Jul. 10, 1989, pp. 281–286.

H.J. Mamin, et al., "Atomic emission from a gold scanning–tunneling–microscope tip" Physical Review Letters, vol. 65, No. 19, Nov. 5, 1990, pp. 2418–2421.

Sumio Hosaka, et al., "Nanometer–sized phase–change recording using a scanning near–field optical microscope with a laser diode" Jpn. J. Appl. Phys. vol. 35, Part 1, No. 1B, Sep. 13, 1995, pp. 443–447.

C. Liu, etal., "High–density nanosecond charge trapping in thin films of the photoconductor ZnODEP" Science, vol. 261, Aug. 13, 1993, pp. 897–899.

(List continued on next page.)

*Primary Examiner*—Muhammad Edun

(57) ABSTRACT

An ultra-high-density data storage device including at least one energy-channeling component and a storage medium that usually includes at least one rectifying junction region. The energy-channeling component is generally capable of emitting such energies as, but not limited to, thermal, optical and electronic energy. The energy-channeling component is generally located either within close proximity of or in direct contact with the storage medium. The storage medium typically includes nanometer-scaled storage areas.

20 Claims, 9 Drawing Sheets

OTHER PUBLICATIONS

E. Huber, et al., "Laser–induced crystallization of amorphous GeTe: A time–resolved study" Physical Review, vol. 36, No. 3, Jul. 15, 1987, pp. 1595–1604.

A. Sato, et al., "Nanometre–scale recording and erasing with the scanning tunnelling microscope" Nature vol. 363 Jun. 3, 1993 pp. 431–432.

V.P. Jaecklin, et al. "Novel polysilicon comb actuators for xy–stages" Micro Electro Mechanical Systems, Feb. 4–7, 1992, pp. 147–149.

E. Betzig, etal., "Fiber laser probe for near–field scanning optical microscopy" Appl. Phys. Lett. 63 (26), Dec. 27, 1993, pp. 3550–3552.

C.A. Spindt, et al., "Physical properties of thin–film emission cathodes with molybdenum cones" Journal of Applied Physics, vol. 47, No. 12, Dec., 1976, pp. 5248–5263.

R. C. Barrett, et al., "Charge storage in a nitride–oxide–silicon medium by scanning capacitance microscopy" J. Appl. Phys. vol. 70 (5), Sep. 1, 1991 pp. 2725–2733.

T.R. Albrecht, et al. "Nanometer–scale hole formation on graphite using a scanning tunneling microscope" Appl. Phys. Lett. 55 (17), Oct. 23, 1989 pp. 1727–1729.

B.G. Yacobi, et al., "Electron–beam–induced information storage in hydrogenated amorphous silicon devices" Appl. Phys. Lett. 44(7), Apr. 1, 1994, pp. 695–697.

Roger T. Howe, et al., "Silicon micromechanics: sensors and actuators on a chip" IEEE Spectrum, Jul. 1990, pp. 29–35.

Gary W. Jones, et al., "Silicon field emission transistors and diodes" IEEE Transactions on Components, Hybrids, and Manufacturing Technology, vol. 15, No. 6, Dec., 1992, pp. 1051–1055.

* cited by examiner

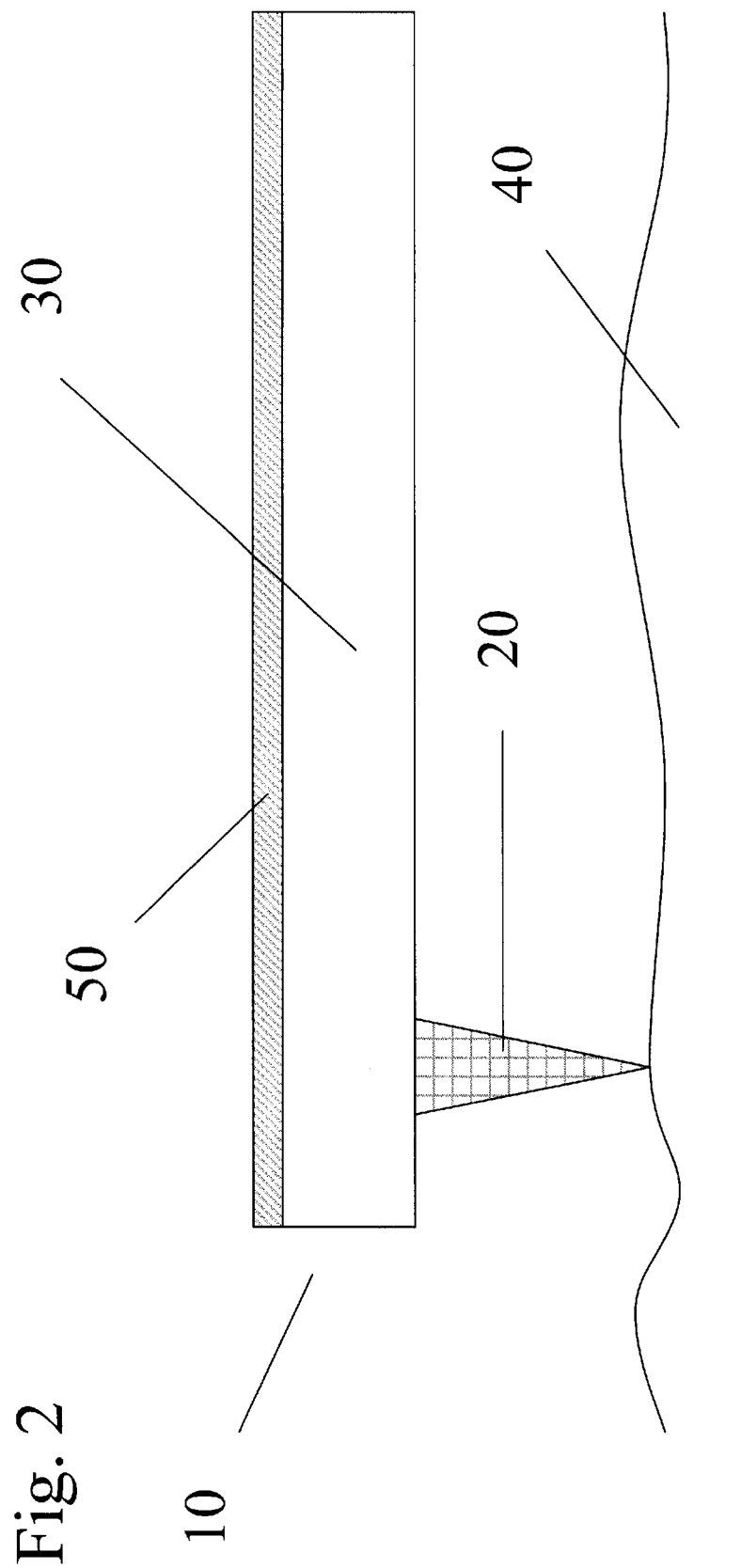

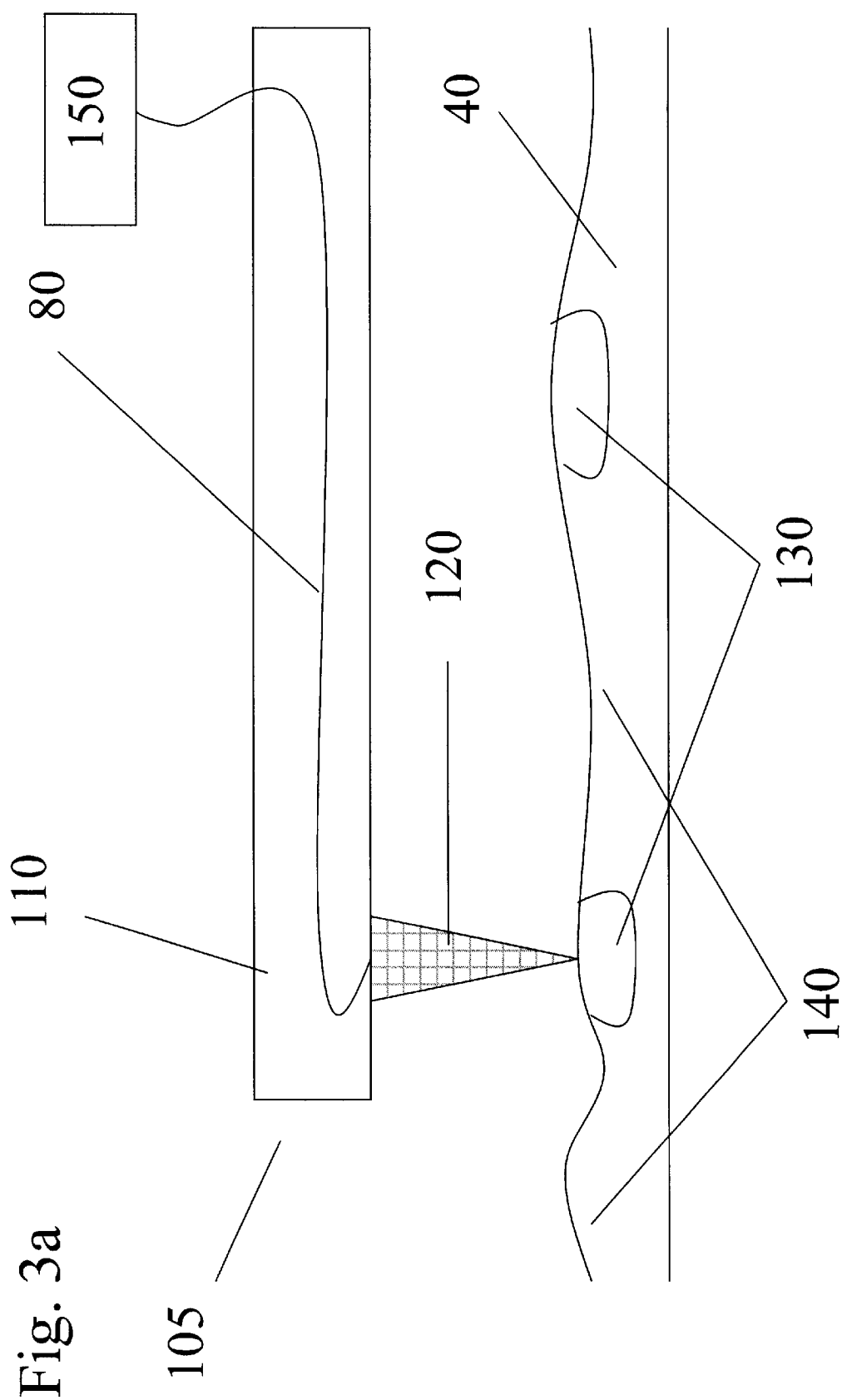

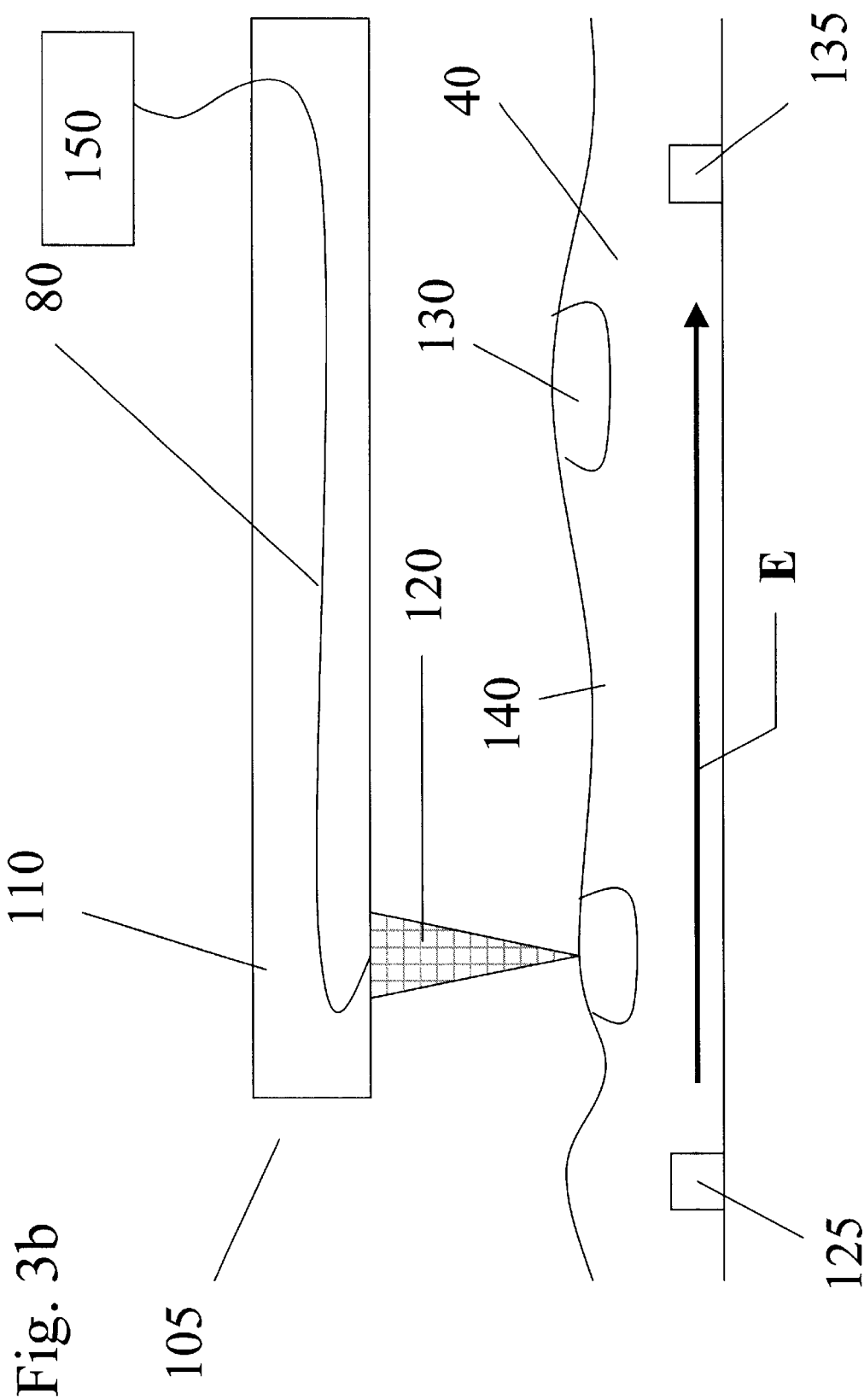

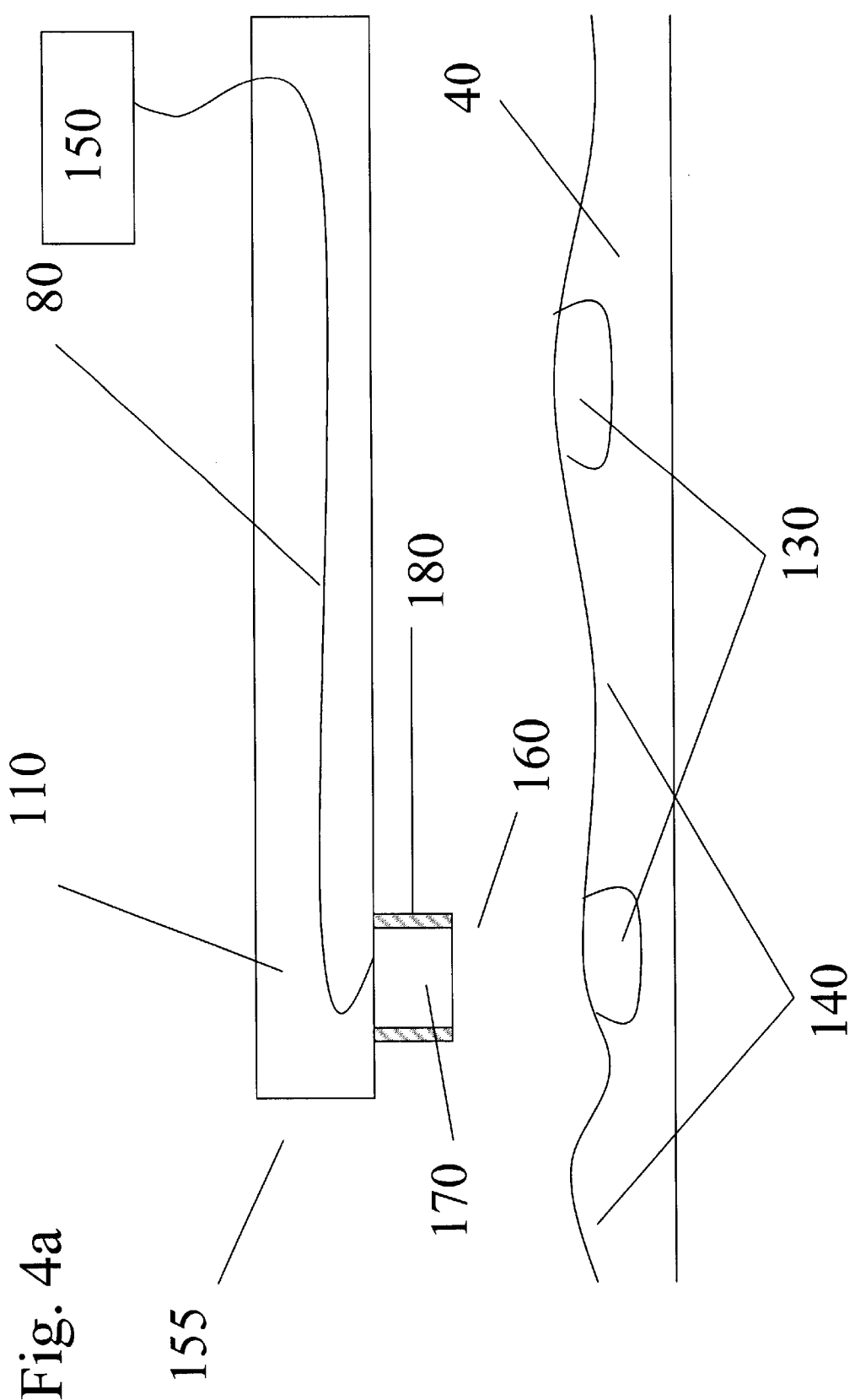

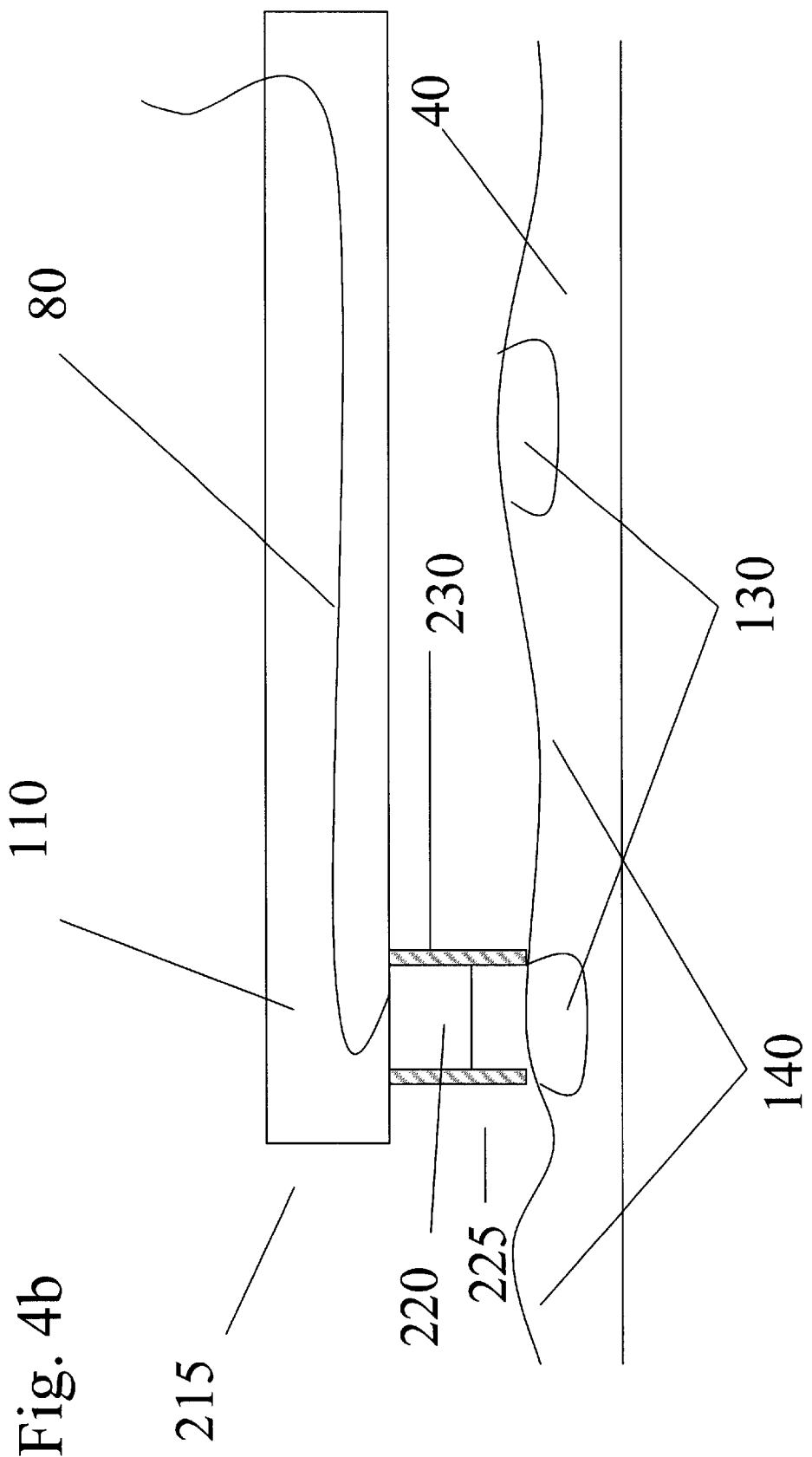

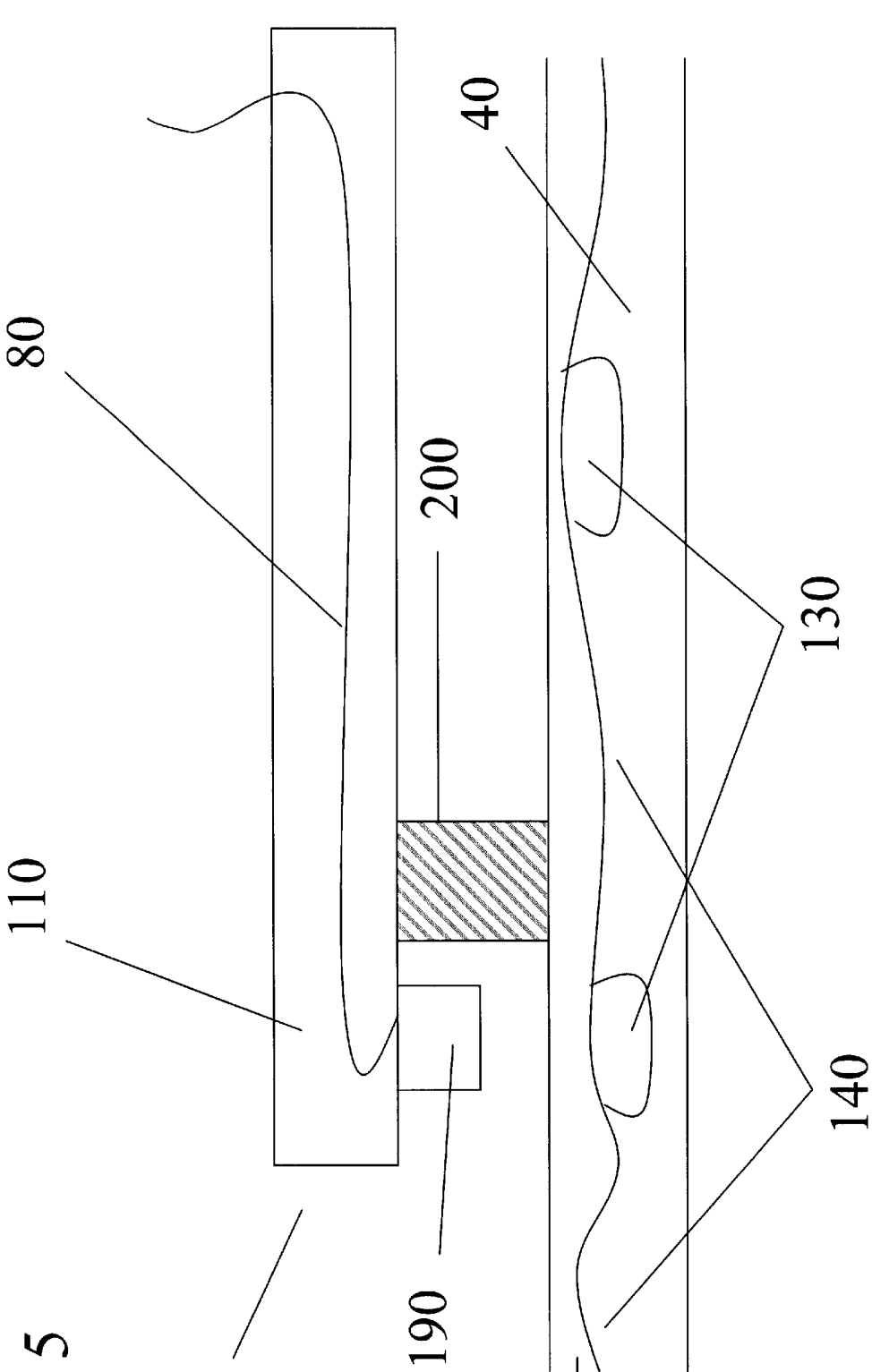

AFM VERSION OF DIODE-AND CATHODOCONDUCTIVITY-AND CATHODOLUMINESCENCE-BASED DATA STORAGE MEDIA

FIELDS OF THE INVENTION

The present invention relates to a data storage device capable of storing, reading and writing data to data storage areas of nanometer dimensions.

BACKGROUND OF THE INVENTION

Recently, scientists have been developing alternative ultra-high-density data storage devices and techniques useful for operating ultra-high-density data storage devices. These devices and techniques store data bits within storage areas sized on the nanometer scale and possess advantages over conventional data storage devices. Among these advantages are quicker access to the data bits, a lower cost per bit and enablement of the manufacturing of smaller electronic devices.

FIG. 1 illustrates an ultra-high-density data storage device configuration according to the related art that includes a storage medium 40 that is separated into many storage areas (illustrated as squares on the storage medium 40), each capable of storing one data bit. Two types of storage areas, unmodified regions 140 that typically store data bits representing the value "0" and modified regions 130 that typically store data bits representing the value "1", are illustrated in FIG. 1. Typical periodicities between any two storage areas in these devices range between 1 and 100 nanometers.

FIG. 1 also shows, conceptually, emitters 350 positioned above the storage medium 40, and a gap between the emitters 350 and the storage medium 40. The emitters 350 are capable of emitting electron beams and are arranged on a movable emitter array support 360 (also known as a "micromover") that can hold hundreds or even thousands of emitters 350 in a parallel configuration. The emitter array support 360 provides electrical connections to each emitter 350 as illustrated conceptually by the wires on the top surface of emitter array support 360.

The emitter array support 360 can move the emitters 350 with respect to the storage medium 40, thereby allowing each emitter 350 to scan across many storage areas on the storage medium 40. In the latter case, the storage medium 40 can be placed on a platform that moves the storage medium 40 relative to the emitter array support 360. The platform can be actuated electrostatically, magnetically or by the use of piezoelectrics and, dependent upon the range of motion between the emitter array support 360 relative to the storage medium 40, each emitter 350 can have access to data bits in tens of thousands or even millions of data storage areas.
Related Art: (Ultra-High Density Data Storage Devices)

Some specific embodiments of the ultra-high-density data storage device discussed above are disclosed in U.S. Pat. No. 5,557,596 to Gibson et al. (Gibson '596), the contents of which are incorporated herein in their entirety by reference.

The devices disclosed in the Gibson '596 patent include a storage medium 40 with modified regions 130 and unmodified regions 140, emitters 350 and an emitter array support 360. The Gibson '596 devices provide a relatively inexpensive and convenient method for producing ultra-high-density data storage devices that can be manufactured by well-established and readily-available semiconductor processing technology and techniques. Further, some of the devices disclosed in the Gibson '596 patent are somewhat insensitive to emitter noise and variations in the gap distance between the emitters 350 and the storage medium 40 that may occur when the emitters 350 move relative to the storage medium 40 during device operation. Reasons for these insentivities are related, for example, to the nature of the diode devices disclosed in the Gibson '596 because the diodes allow constant current sources to be connected to the emitters 350 and allow the electron beam energy to be monitored independently of the signal current in order to normalize the signal as described in the Gibson '596 patent. However, the devices disclosed in the Gibson '596 patent must be operated under stringent vacuum conditions.

The storage medium 40, according to the Gibson '596 patent, can be implemented in several forms. For example, the storage medium 40 can be based on diodes such as p-n junctions or Schottky barriers. Further, the storage medium 40 can include combinations of a photodiode and a fluorescent layer such as zinc oxide. This type of configuration relies on monitoring changes in the cathodoluminescence of the storage medium 40 to detect the state of a written bit. Also, according to the Gibson '596 patent, the storage medium 40 can be held at a different potential than the emitters 350 in order to accelerate or decelerate electrons emanating from the emitters 350.

The emitters 350 disclosed in the Gibson '596 patent are electron-emitting field emitters made by semiconductor micro-fabrication techniques and emit very narrow electron beams. These can be silicon field emitters but can also be Spindt emitters that typically include molybdenum cone emitters, corresponding gates and a pre-selected potential difference applied between each emitter and its corresponding gate. The Gibson '596 patent also discloses electrostatic deflectors that sometimes are used to deflect the electron beams coming from the emitters 350.

According to the Gibson '596 patent, the emitter array support 360 can include a 100×100 emitter 350 array with an emitter 350 pitch of 50 micrometers in both the X- and Y-directions. The emitter array support 360, like the emitters 350, can be manufactured by standard, cost-effective, semiconductor micro-fabrication techniques. Further, since the range of movement of the emitter array support 360 can be as much as 50 micrometers, each emitter 350 can be positioned over any of tens of thousands to hundreds of millions of storage areas. Also, the emitter array support 360 can address all of the emitters 350 simultaneously or can address them in a multiplex manner.

During operation, the emitters 350 are scanned over many storage areas by the emitter array support 360 and, once over a desired storage area, an emitter 350 can be operated to bombard the storage area with either a high-power-density electron beam or a low-power-density electron beam. As the gap between the emitters 350 and the storage medium 40 widens, the spot size of the electron beams also tends to widen. However, the emitters 350 must produce electron beams narrow enough to interact with a single storage area. Therefore, it is sometimes necessary to incorporate electron optics, often requiring more complicated and expensive manufacturing techniques to focus the electron beams.

If the emitters 350 bombard the storage areas with electron beams of sufficient power density, the beams effectively write to the storage medium 40 and change the bombarded storage areas from unmodified areas 140 to modified areas 130. This writing occurs when electrons from the high-power-density-electron beams bombard the storage areas and cause the bombarded storage areas to experience changes of state such as changes from crystalline structures to amorphous structures or from undamaged to thermally damaged.

The changes of state can be caused by the bombarding electrons themselves, specifically when collisions between the electrons and the media atoms re-arranges the atoms, but can also be caused by the high-power-density-electron beams transferring the energy of the electrons to the storage areas and causing localized heating. For phase changes between crystalline and amorphous states, if the heating is followed by a rapid cooling process, an amorphous state is achieved. Conversely, an amorphous state can be rendered crystalline by heating the bombarded storage areas enough to anneal them.

The above writing process is preferable when the storage medium 40 chosen contains storage areas that can change between a crystalline and amorphous structure and where the change causes associated changes in the material's properties. For example, properties such as band structure, crystallography and the coefficients of secondary electron emission coefficient (SEEC) and backscattered electron coefficient (BEC) can be altered altered. According to the devices disclosed in the Gibson '596 patent, these changes in material properties can be detected and allow for read operations to be performed, as will be discussed below.

When a diode is used as the storage medium 40, high-power-density bombarding beams locally alter storage areas on the diode surface between crystalline and amorphous states. The fact that amorphous and crystalline materials have different electronic properties is relied upon to allow the performance of a read operation, as will be discussed further below.

When writing to a storage medium 40 made up of a photodiode and a fluorescent material, the emitters 350 bombard and alter the state of regions of the fluorescent material with the high-power-density-electron beams. This bombardment locally alters the densities of radiative and non-radiative recombination centers and, thereby, locally alters the light-emitting properties of the bombarded regions of the fluorescent layer and allows yet another approach, to be discussed below, for performing a read operation.

Once data bits have been written to the storage medium 40, a read process can retrieve the stored data. In comparison to the high-power-density-electron beams used in the write process, the read process utilizes lower-power-density-electron beams to bombard the storage regions on the storage medium 40. The lower-power-density-electron beams do not alter the state of the storage areas they bombard but instead either are altered by the storage medium 40 or generate signal currents therein. The amplitudes of these beam alterations or signal currents depend on the states of the storage areas (e.g., crystalline or amorphous) and change sharply dependent on whether the storage areas being bombarded are modified regions 130 or unmodified regions 140.

When performing a read operation on a storage medium 40 that has storage areas that can change between a crystalline and amorphous structure and where the change causes associated changes in the material's properties, the signal current can take the form of a backscattered or secondary electron emission current made up of electrons collected by a detector removed from the storage medium. Since SEEC and BEC coefficients of amorphous and crystalline materials are different, the intensity of the current collected by the detector changes dependent on whether the lower-power-density-electron beam is bombarding a modified region 130 or an unmodified region 140. By monitoring this difference, a determination can be made concerning whether the bombarded storage area corresponds to a "1" or a "0" data bit.

When a diode is chosen as the storage medium 40, the signal current generated is made up of minority carriers that are formed when the lower-power-density electron beam bombards a storage area and excites electron-hole pairs. This type of signal current is specifically made up of those formed minority carriers that are capable of migrating across the interface of the diode and of being measured as a current. Since the number of minority carriers generated and capable of migrating across the diode interface can be strongly influenced by the crystal structure of the material, tracking the relative magnitude of the signal current as the beam bombards different storage areas allows for a determination to be made concerning whether the lower-power-density-electron beam is bombarding a modified region 130 or an unmodified region 140.

In the case of a photodiode and fluorescent material used as the storage medium 40, the lower-power-density electron beam used for reading stimulates photon emission from the fluorescent material. Dependent on whether the region bombarded is a modified region 130 (e.g., thermally modified) or an unmodified region 140, the number of photons stimulated in the fluorescent material and collected by the photodiode will be significantly different. This leads to a different amount of minority carriers generated in the photodiode by the stimulated photons and results in a difference in the magnitude of the signal current traveling across the photodiode interface as the beam bombards different storage areas.

In many of the embodiments described above, a bulk-erase operation is possible to reset all of the modified regions 130 present on the storage medium 40 after the writing process. For example, if an entire semiconductor storage medium 40 is properly heated and cooled, the entire storage medium 40 can be reset to its initial crystalline or amorphous structure, effectively erasing the written data bits. With regard to a photodiode storage medium 40, bulk thermal processing can reset thermally altered areas by processes such as annealing.

Related Art: Atomic Force Microscopes (AFM)

FIG. 2 illustrates a top view of a typical AFM probe 10 according to the related art that is made up of a tip 20, a compliant support 30 that supports the tip 20 and that itself is supported by other components of the AFM (not shown) and a piezoelectric material 50 deposited on the top surface of the compliant suspension 30.

The probe 10 can be operated in the contact, non-contact or tapping (intermittent contact) AFM modes that are well known in the art and that will only briefly be discussed here. The contact mode allows for direct contact between the tip 20 and the storage medium 40 while the non-contact mode (not shown) keeps the tip 20 in close proximity (generally on the order of or less than approximately 100 nanometers) to the storage medium 40. The tapping mode allows the compliant suspension 30 to oscillate in a direction perpendicular to the surface of the storage medium 40 while the probe 10 moves in a direction parallel relative to the storage medium 40 and the tip 20 therefore contacts or nearly contacts the storage medium 40 on an intermittent basis and moves between positions that are in direct contact with and in close proximity to the storage medium 40.

The tip 20 is typically, although not exclusively, made from silicon or silicon compounds according to common semiconductor manufacturing techniques. Although the tip 20 is typically used to measure the dimensions of surface features on a substrate such as the storage medium 40 discussed above, the tip 20 can also be used to measure the electrical properties of the storage medium 40.

As stated above, the tip 20 in FIG. 2 is affixed to a compliant suspension 30 that is sufficiently flexible to oscillate as required by the intermittent contact or tapping mode or as required to accommodate unwanted, non-parallel motion of the tip suspension with respect to the storage medium during scanning (so as to keep the tip in contact or at the appropriate working distance). The compliant suspension 30 typically holds the tip 20 at one end and is attached to and supported by the remainder of the AFM or STM structure on the other end. Storage medium 40, in a typical AFM structure, rests on a platform that is moved with relation to the tip 20, allowing the tip 20 to scan across the storage medium 40 as the platform moves.

FIG. 2 illustrates a piezoelectric material 50 deposited on the top surface of the compliant suspension 30. As the tip 20 moves across the storage medium 40, the tip 20 moves the compliant suspension 30 up and down according to the surface variations on the storage medium 40. This movement, in turn, causes either compression or stretching of the piezoelectric material 50 and causes a current to flow therein or causes a detectable voltage change. This voltage or current is monitored by a sensor (not shown) and is processed by other components of the AFM or STM to produce images of the surface topography of the scanned area.

Disadvantages of the Related Technology:

Typical ultra-high-density data storage devices, the devices disclosed by the Gibson '596 patent and the AFM/STM devices described above have several shortcomings for producing high-density data storage devices.

For example, ultra-high-density data storage devices suffer from at least one of the following disadvantages: relatively small signal currents, relatively large beam spot sizes and relatively poor signal-to-noise ratios.

Among the reasons for the relatively poor signal-to-noise ratio disadvantage is included the susceptibility of devices that utilize non-contact methods (e.g., field emitters or STM tips) to experiencing changes in the gap distance between the emitters 350 and the storage medium 40 as the emitters 350 move relative to the storage medium 40. These gap-distance changes lead to intensity changes in the signal current that are not attributed to variations in the state of the bombarded storage areas and therefore add noise.

The relatively large spot sizes can be at least partially attributed to spreading of the beam over the gap distance. In order to obtain smaller spot sizes, electron optics are sometimes used to focus the electron beams. However, such configurations have the disadvantage of being more complex and therefore often more difficult and costly to manufacture.

Other disadvantages of current ultra-high-density storage devices that utilize non-contact methods are that they do not allow for the gap distance between the storage medium 40 and the emitters 350 to be controlled passively. Rather, because the emitters 350 are not in direct contact with the storage medium 40, it is necessary to continuously monitor and maintain the gap distance between the emitters 350 and the storage medium 40 in order to insure that all storage areas are written to and read from with substantially the same concentration of beam electrons.

Yet other disadvantages of ultra-high-density data storage devices are that such devices can be required to operate at least under a partial vacuum and often operate effectively only under stringent vacuum conditions.

Hence, what is needed are ultra-high density devices that provide relatively large signal currents, allow relatively focused beams to bombard the storage medium without necessitating costly focusing optics and provide relatively good signal-to-noise ratios of the devices.

What is needed are devices and methods for writing data to and reading data from a storage medium that essentially obviate the need for monitoring and dynamically controlling distances between the storage medium and the emitters of the devices or of controlling the focus of the emitters.

What is needed are devices and methods for writing data to and reading data from storage media that either alleviate the need for a vacuum to be drawn around the emitters or that reduce the degree of vacuum required.

What is needed are devices and methods for writing data to and reading data from storage media that allow for a more constant beam flux to be maintained between the emitters and the storage media.

What is needed are rapid, reliable, cost-effective and convenient methods of manufacturing and operating data storage devices for ultra-high-density data storage.

SUMMARY OF THE INVENTION

Certain embodiments of the present invention are directed at a data storage device including a storage medium including a rectifying junction region, at least one nanometer-scaled unmodified region near the rectifying junction region, at least one nanometer-scaled modified region near the rectifying junction region and at least one energy-emitting probe positioned within close proximity of a surface of the storage medium.

Certain embodiments of the present invention are also directed at a method of data storage including providing a storage medium that includes a rectifying junction region and a nanometer-scaled unmodified region, positioning an energy-channeling component within close proximity of the storage medium, and converting the nanometer-scaled unmodified region into a nanometer-scaled modified region.

Certain embodiments of the present invention provide ultra-high density devices that provide relatively large signal currents, allow relatively focused beams to bombard the storage medium without necessitating costly focusing optics and provide relatively good signal-to-noise ratios of the devices.

Certain embodiments of the present invention provide devices and methods for writing data to and reading data from storage media that either alleviate the need for a vacuum to be drawn around the emitters or that reduce the degree of vacuum required.

Certain embodiments of the present invention provide devices and methods for writing data to and reading data from storage media that allow for a more constant beam flux to be maintained between the emitters and the storage media.

Certain embodiments of the present invention provide rapid, reliable, cost-effective and convenient methods of manufacturing and operating data storage devices for ultra-high-density data storage.

BRIEF DESCRIPTION OF THE DRAWINGS

FIG. 2 illustrates a side view of an AFM probe configuration according to the related art.

FIG. 3a illustrates a side view of a data storage device according to certain embodiments of the present invention wherein an AFM contact mode of operation is used along with a first embodiment of a tip.

FIG. 3b illustrates a side view of a data storage device according to certain embodiments of the present invention wherein a cathodoconductivity measurement may be performed.

FIG. 4a illustrates a side view of certain embodiments of the present invention wherein an AFM non-contact or tapping mode of operation is used along with a tip that differs from the tip illustrated in FIG. 3a.

FIG. 4b illustrates yet other embodiments of the present invention where the tip has a portion in contact with the storage medium and a portion offset from the storage medium.

FIG. 5 illustrates another embodiment of the present invention where two tips are present on the compliant suspension and where one tip contacts the storage medium whereas the other tip does not.

DETAILED DESCRIPTION

Figure 1:
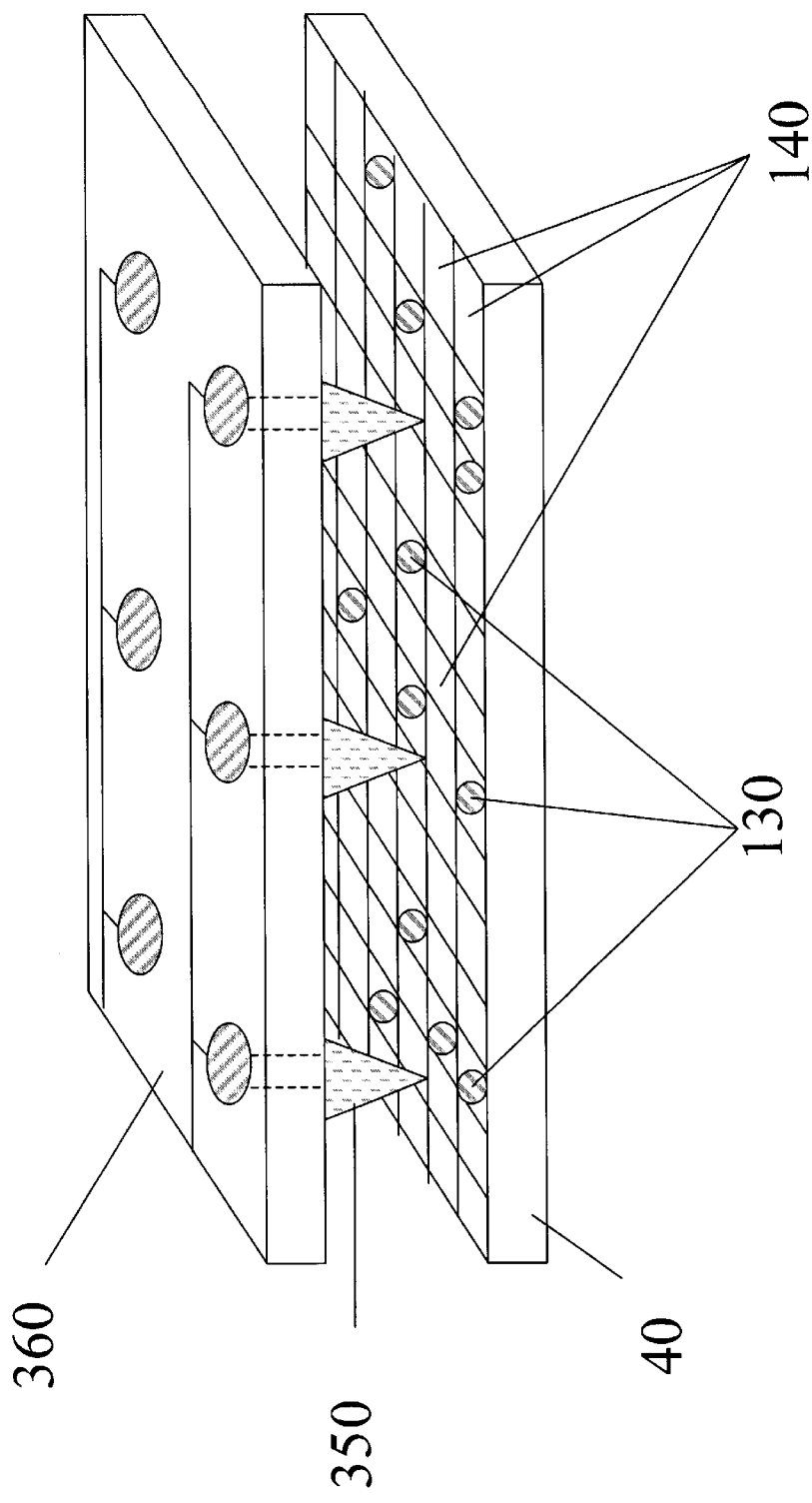
FIG. 1 illustrates an ultra-high-density data storage device according to the related art.

FIG. 3a illustrates an energy-emitting probe 105 within the scope of certain embodiments of the present invention. Although a single probe 105 is illustrated in FIG. 3a, certain embodiments of the present invention include ultra-high-density data storage device configurations wherein multiple probes 105 are attached to emitter array supports 360 such as those discussed above.

In addition to the emitter array support 360 embodiments discussed in the Gibson '596 patent, certain embodiments of the present invention include emitter array support 360 configurations that are not attached to a vacuum casing, since certain embodiments of the present invention can be operated at pressures such as 1 atmosphere or other pressures above $10^{-5}$ torr. According to these embodiments, the emitter array support 360 is supported instead either by components typically included within AFM/STM configurations or by components that one skilled in the art of the present invention would know to use in order to position the emitter array support 360 at desired locations above the storage medium 40. Also, the probes 105 on the emitter array support 360 can write to and read from either a single storage area or can scan across up to and including millions of storage areas. Further, the emitter array support 360 configurations, according to certain embodiments of the present invention, can have ranges of motion greater than 50 microns. Even further, the storage medium 40 according to the present invention can include one or more rectifying junctions.

The energy-emitting probes 105 supported by the emitter array support 360 can, according to certain embodiments of the present invention, be addressed simultaneously or in a multiplexed manner and the wiring to the probes is not restricted to the single wire illustrated in FIG. 1. Either one or a multitude of wires can be used, depending on the embodiment.

According to certain embodiments of the present invention, each probe 105 includes a compliant suspension 110 that has a connection 80 linking an energy source 150 to a tip 120 or other physical energy-channeling component, either directly or indirectly, from the probe 105 to the storage medium 40. The energy source 150 allows the tip 120 to provide a localized source of energy and can, according to certain embodiments, emit a high-power-density beam capable of altering the state of the region of the storage medium 40 being bombarded by the emitted beam. In certain embodiments, the tip 120 can be in direct contact with the storage medium 40 or can be separated from the storage medium by distances typical for AFM configurations in either the non-contact or intermittent contact modes.

The tip 120 in certain embodiments of the present invention is capable of emitting beams of energy in forms including, but not limited to, electrons, light, heat or other energy forms capable of turning an unmodified region 140 into a modified region 130 by changing the state of the storage area as discussed above. Although the data bits discussed above are binary in the sense that they can be, for example, in either an amorphous or crystalline state or either thermally modified or unmodified, certain embodiments of the present invention include non-binary data bits where, for example, the state of the data bits can be chosen to be either amorphous or one of several crystalline states.

According to certain embodiments of the present invention, in addition to the storage medium 40 embodiments discussed above, $p^+$-p junctions, $n^+$-n junctions and rectifying junctions not specifically disclosed in the Gibson '596 patent may be used. Further, according to certain embodiments, semiconducting chalcogenide reversible phase-change materials may also be used as part of the storage medium 40. According to certain other embodiments of the present invention, direct bandgap III–VI chalcogenide-based phase change materials are preferably used.

Also, the storage medium 40 can be configured in a manner illustrated in FIG. 3b that allows for cathodoconductivity measurements to be recorded. In such embodiments of the present invention, the material making up storage medium 40 can be a cathodoconductive chalcogenide-based phase change material made of at least one of the following elements: Se, Te, S, Sb, Ag, In and Ga.

As illustrated in FIG. 3b, modified regions 130 and unmodified regions 140 are positioned between electrodes 125, 135 that are in contact with storage medium 40. The electrodes 125, 135 may be positioned above, below or to the side of the modified regions 130 and unmodified regions 140 and more than one pair of electrodes 125, 135 may be present in the storage medium 40. When a bias voltage is applied to the electrodes 125, 135, an electric field E is induced in the plane of the cathodoconductive storage medium 40 and a dark current flows between the electrodes 125, 135.

When performing cathodoconductivity measurements, the modified regions 130 and unmodified regions 140 are bombarded by electron beams emitted from the tip 120, electron carriers and hole carriers are created, the electric field E accelerates the free carriers towards the electrodes 125, 135 and a signal current caused by the movement of the electrons and holes can be detected by a sensor (not shown) attached to one of the electrodes. Because bombarding a modified region 130 and an unmodified region 140 leads to the creation and collection of different concentrations of carriers, a read operation is able to be performed by monitoring the amplitude of the signal current as a function the position of the tip 120.

According to certain embodiments of the present invention, in addition to the emitters 350 discussed above, emitters 350 such as, but not limited to, flat cathode emitters can also be used to produce the energy beams needed to read from and write to the storage medium 40.

Although the tip 120 is illustrated in FIGS. 3a and 3b as being in the contact AFM mode, the tip 120 can also be operated in non-contact and tapping AFM modes. Also, the compliant suspension 110 may take other geometries known to those skilled in the art as compatible with other components in the embodiments of the present invention.

In addition to the geometry of tip 120 illustrated in FIGS. 3a and 3b, certain embodiments of the present invention can incorporate other component or tip geometries, some examples of which are disclosed in U.S. Pat. No. 5,936,243 to Gibson et al. (Gibson '243), the contents of which are herein incorporated in their entirety by reference. The components or tips used in the embodiments of the present invention can have any geometry that one skilled in the art would know to use in practicing the present invention, and generally should be formed from materials capable of withstanding the temperature conditions experienced when channeling the high-power-density beams discussed above.

The components, such as tip 120 illustrated in FIGS. 3a and 3b can include a composite material with different types of grains such as, but not limited to, wear-resistant grains (to prolong the life of the tip 120 as it travels across and contacts the storage medium), wear-reducing grains (to protect against scratching of the storage medium 40) and conductive grains. These composite materials allow for the tip 120 to be conductive and to emit high-power-density energy beams while also providing extended lifetimes for the tip 120 and storage medium 40.

Certain other embodiments of the present invention, as illustrated in FIG. 4a, can include a sheathed tip 160. FIG. 4a illustrates an energy-emitting probe 155 that can be operated in a contact, non-contact or a tapping mode. In the illustrated non-contact mode, the distance between the tip 160 and the storage medium 40 is less than 100 nanometers. In the tapping mode, a range of amplitudes and frequencies common to AFM operation may be used.

The tip 160 in FIG. 4a includes a core 170 made up of a conducting material that is capable of emitting an energy beam of sufficient power density to transform an unmodified region 140 into a modified region 130 as previously discussed. The tip 160 also includes a cladding 180 that is made up of wear-resistant or wear-reducing material and that is substantially protruding the same distance away from the compliant suspension 110 as the core 170.

Among the purposes of the cladding 180 is to extend the lifetime of the tip 160 when the probe 155 is operated in either a tapping or contact AFM mode.

FIG. 4b illustrates an energy-emitting probe 215 in contact with the storage medium 40. Although the probe 215 can also be operated in tapping and non-contact modes, in the contact mode illustrated, the contacting sheath 230 protrudes from the compliant suspension 110. According to certain embodiments, the contacting sheath 230 protrudes approximately 100 nanometers or more further than the non-contacting core 220. Because the contacting sheath 230 is made of wear-resistant or wear-reducing material, the contacting sheath 230 extends the lifetime of the tip 225 by not allowing the non-contacting core 220 to directly contact the storage medium 40 and to be worn away. The non-contacting core 220 emits a high-power-density energy beam and is connected to an energy source 150 (not shown).

When the contacting sheath 230 is in direct contact with the storage medium 40, an advantage of certain embodiments of the present invention is attained because the emitting non-contacting core 220 is positioned at a substantially fixed distance away from the storage medium 40 as the probe 215 travels across the storage medium 40. Hence, even though the beam emitting source is positioned at a distance away from the storage medium 40, simpler focusing optics may be required, dependent on the particular embodiment, thereby easing the manufacturing and control process of the writing operation. In particular, no servoing is required for gap control so the focusing optics can be simplified and, in some cases, even eliminated.

FIG. 5 illustrates other embodiments of the present invention wherein an energy-emitting probe 185 includes two components or tips: a non-contacting, energy-channeling component or tip 190 and a contacting positioning component or tip 200. Like the probes discussed above and below, the probe 185 can be used in any of the AFM modes discussed above as well as with any of the storage media 40 discussed previously. In essence, all of the components of all of the embodiments of the present invention disclosed herein can be mixed and matched to form other embodiments also within the scope of the present invention.

The contacting tip 200 is made from a wear-resistant or wear-reducing material to extend the life of the n on-contacting tip 190 that emits the energy beam and/or extends the lifetime of the storage medium. Like the contacting sheath 230, the contacting tip 200 allows the non-contacting tip 190 to be positioned at a fixed distance relative to the storage medium 40 without requiring position monitoring and control and simplifies the requirements for beam-focusing optics. Further, when made of wear-reducing material, the contacting tip 200 reduces scratching or grooves in the storage medium 40 that may develop upon repeated read and write operation.

Also illustrated in FIG. 5 is a surface layer 210, useable in conjunction with certain embodiments of the present invention illustrated in FIG. 5 and in many other embodiments of the present invention discussed above and below. Among the advantages provided by the surface layer 210 is the ability to extend the lifetime of the storage medium 40 upon repeated read and write operations.

The surface layer 210 may be made up of any material capable of reducing wear, evaporation/ablation or material flow, and the changes in surface topography associated therewith, of the storage medium 40. The surface layer 210 can also be made up of any material capable of preventing contamination of any of the tips within the scope of the present invention. In certain embodiments of the present invention, the surface layer 210 can act as an electrically conductive surface electrode. In certain other embodiments, the surface layer 210 can be made from materials such as, but not limited to, silicon dioxide or alumina ($Al_2O_3$).

Another advantage of the surface layer 210 is that, because the material(s) from which it is made can have higher melting temperatures than the storage medium 40, during the write operation discussed above, the presence of the surface layer 210 prevents depositing of any storage medium 40 material onto any of the probe tips of the present invention, even when the tips are used according to the contact AFM mode. It should be noted that, especially if light is the type of energy beam being used, the surface layer 210 can be chosen from materials transparent to light and, with certain types of energy beams, one or more layers of material can be positioned between the surface layer 210 and the storage medium 40.

Figure 6A:
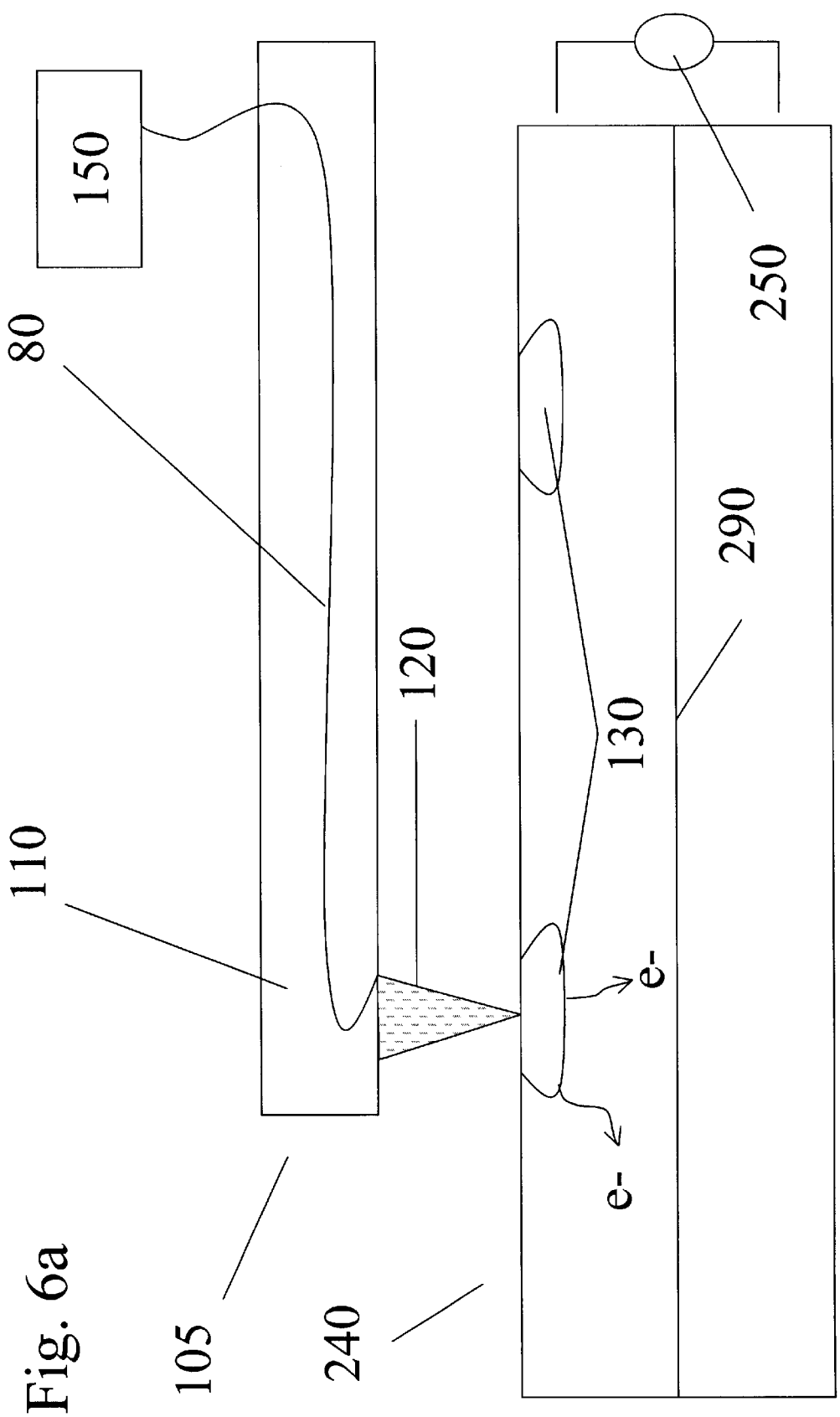
FIG. 6a illustrates a diode-type storage medium according to certain embodiments of the present invention.

FIG. 6a illustrates a storage medium 40 in the form of a diode 240 with a diode interface 290 across which minority carriers migrate. The generation of minority carriers and their migration across the diode interface 290 are analogous to the diode configuration discussed in the Gibson '596 patent. Namely, a different number of carriers are generated in modified the regions 130 than in the unmodified regions 240. Further, of those carriers generated, the collection efficiency can be different due to factors discussed in the Gibson '596 patent. A total current is read across the current meter 250 and it is used to determine whether the storage area of the diode 240 bombarded is a modified region 130 or unmodified region 140. It should be noted that the diode configuration illustrated in FIG. 6a can be used in conjunction with any of the probes and device components included within the embodiments of the present invention.

Figure 6B:
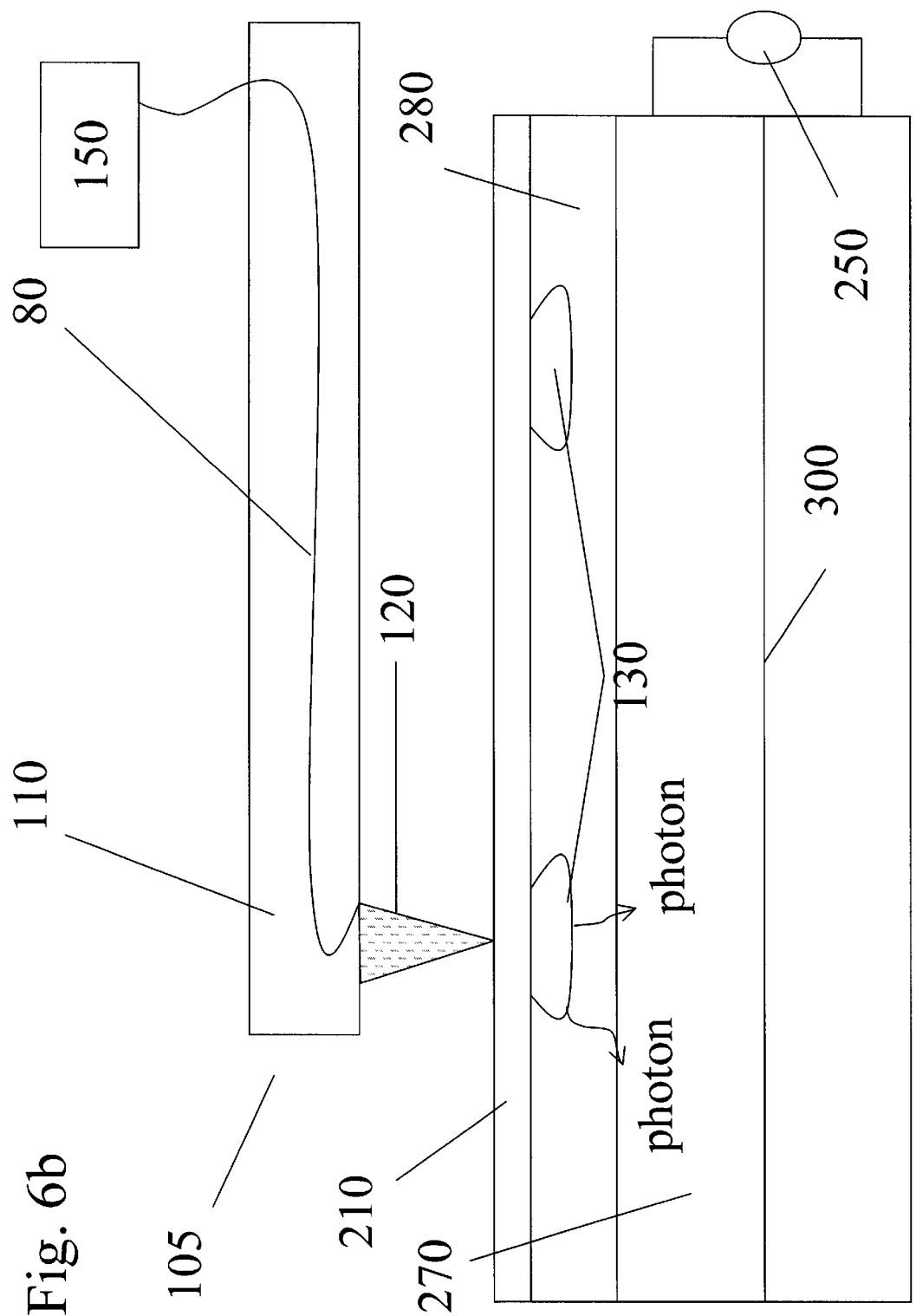
FIG. 6b illustrates a fluorescent material/photodiode-type storage medium according to the certain embodiments of the present invention.

FIG. 6b illustrates an embodiment of the present invention wherein a photodiode 270 with a photodiode interface 300 and a fluorescent material 280 deposited on the photodiode 270 are present. Also, the above-discussed surface layer 210 is illustrated to protect the fluorescent material 280 according to certain embodiments of the present invention. According to certain embodiments of the present invention, a photodiode or photodetector can be used to monitor the stimulated photon emission due to the bombardment of the electron beam.

The fluorescent layer 280 of the present invention can be zinc oxide, as discussed previously, but can also be chosen from materials such as, but not limited to, direct bandgap III–VI chalcogenide-based phase change materials. The fluorescent layer 280 can be written to by the methods discussed above and in the Gibson '596 patent. Additionally, the fluorescent material 280 can also be written to, according to certain embodiments of the present invention, by methods that alter the fluorescent layer 280 such that, for example, the electronic band structure of the material is modified (e.g., the material is changed from a direct band gap material to an indirect band gap material). According to certain embodiments of the present invention, the fluorescent layer 280 can also be written to by, for example, changing the wavelength of the emission, the generation rate and or the optical properties of the medium such that different amounts of light escape the material. Further, certain embodiments of the present invention write to the fluorescent layer 280 by altering the concentration of the non-radiative recombination sites.

According to certain embodiments of the present invention, any of the above-discussed probes or any other probe within the scope of certain embodiments of the present invention may be used to write and read to the fluorescent material 280 or any other embodiments of the storage medium 40. During the read operation, a different number of photons are emitted from the modified regions 130 than the unmodified regions 140 of the fluorescent material 280, leading to the generation of a different number of minority carriers crossing the photodiode interface 300. Using the meter 250, it is possible to determine whether the energy beam emanating from the tip of the probe used in conjunction with the photodiode configuration is bombarding a modified region 130 or an unmodified region 140.

Although the above embodiments are representative of portions of the present Invention, other embodiments of the present invention will be apparent to those skilled in the art from a consideration of this specification or practice of the present invention disclosed herein. It is intended that the specification and examples be considered as exemplary only, with the present invention being defined by the claims and their equivalents.

What is claimed is:

1. A data storage device comprising:
   a storage medium including a rectifying junction region;
   a nanometer-scaled unmodified region in a first physical state near the rectifying junction region;
   a nanometer-scaled modified region in a second physical state near the rectifying junction region; and
   an energy-emitting probe positioned within close proximity of a surface of the storage medium.

2. The data storage device of claim 1, wherein the rectifying junction comprises at least one device chosen from the group including a photodiode with an attached fluorescent layer, a p-n junction, a $p^+$-p junction, an $n^+$-n junction and a Schottky barrier.

3. The data storage device of claim 1, wherein the modified region and the unmodified region are positioned within 100 nanometers of each other.

4. The data storage device of claim 1, wherein the energy-emitting probe further comprises an energy-channeling component.

5. The data storage device of claim 4, wherein the energy-channeling component is in direct contact with the storage medium.

6. The data storage device of claim 4, wherein the energy-channeling component channels light energy to the storage medium.

7. The data storage device of claim 4, wherein the energy-channeling component channels heat energy to the storage medium.

8. The data storage device of claim 4, wherein the energy-channeling component channels electrons to the storage medium.

9. The data storage device of claim 4, wherein the energy-channeling component comprises at least one type of grain chosen from the group consisting of conductive grains, wear-reducing grains and wear-resistant grains.

10. The data storage device of claim 4, wherein the energy-channeling component comprises a core and a sheath.

11. The data storage device of claim 10, wherein the sheath extends further towards the surface of the storage medium than the core.

12. The data storage device of claim 4, wherein the energy-emitting probe further comprises a positioning component extending further towards the surface of the storage medium than the energy-channeling component.

13. The data storage device of claim 1, wherein the first physical state is a crystalline state and wherein the second physical state is an amorphous state.

14. A method of data storage comprising:
   providing a storage medium including a rectifying junction region and a nanometer-scaled unmodified region;
   positioning an energy-channeling component within close proximity of the storage medium; and
   converting the nanometer-scaled unmodified region of a first physical state into a nanometer-scaled modified region of a second physical state.

15. The method of claim 14, further comprising:
   determining whether the component is positioned over a modified region or an unmodified region.

16. The method of claim 15, wherein the determining step comprises performing a cathodoconductivity measurement.

17. The method of claim 14, wherein the positioning step comprises physically contacting the component to the storage medium.

18. The method of claim 14, wherein the converting step is performed under a pressure of greater than $10^{-5}$ torr.

19. A data storage device comprising:
   a storage medium including a rectifying junction region;
   a nanometer-scaled unmodified region in a first optical state near the rectifying junction region;
   a nanometer-scaled modified region in a second optical state near the rectifying junction region; and
   an energy-emitting probe positioned within close proximity of a surface of the storage medium.

20. The data storage device of claim 19, wherein the energy-emitting probe further comprises a positioning component extending further towards the surface of the storage medium than an energy-channeling component comprised within the energy-emitting probe.

* * * * *